United States Patent Office 3,197,646
Patented July 27, 1965

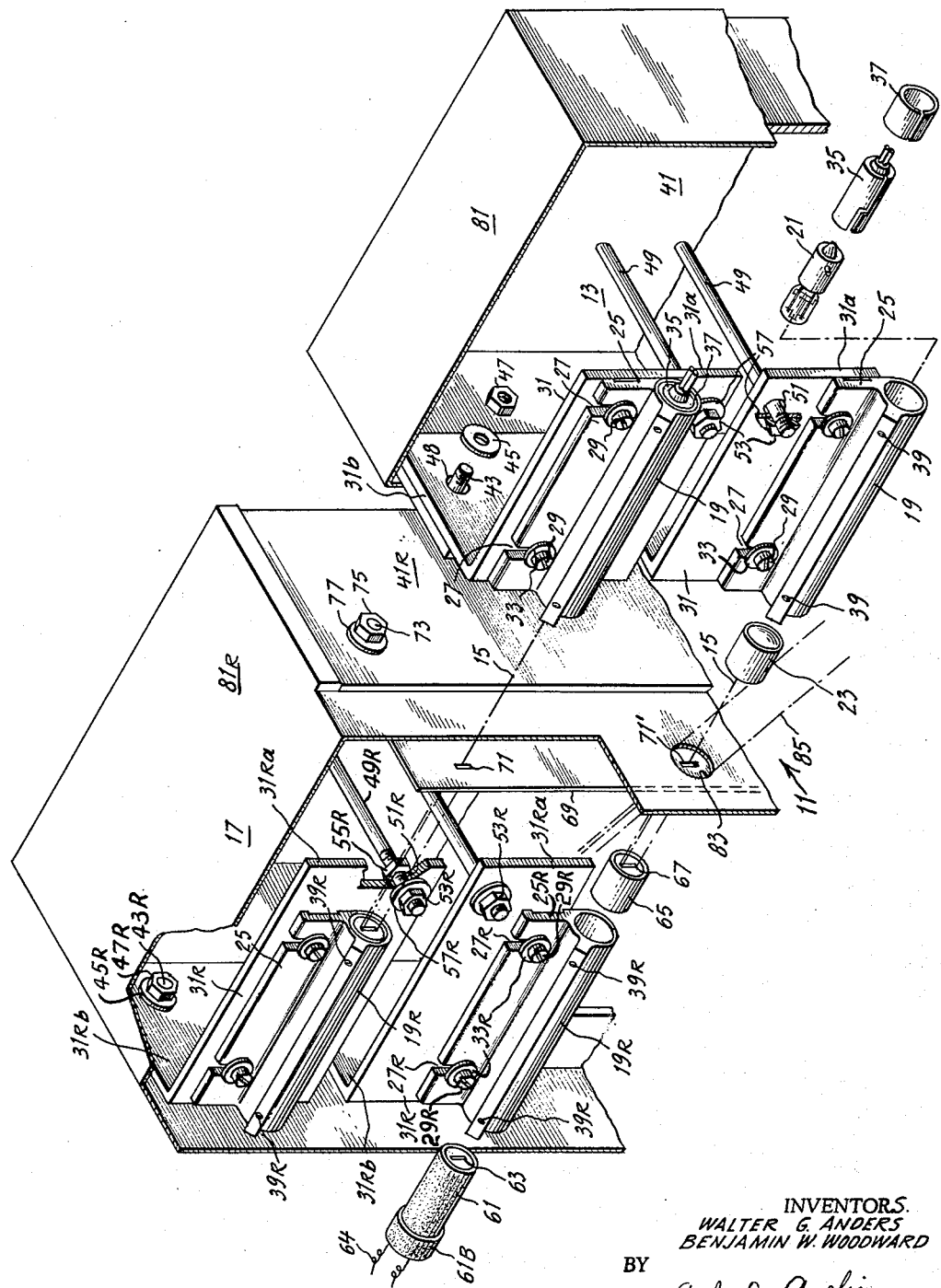

3,197,646
PHOTOSENSITIVE OBJECT DETECTING
MECHANISM
Walter G. Anders and Benjamin W. Woodward, Tonawanda, N.Y., assignors to Sperry Rand Corporation, New York, N.Y., a corporation of Delaware
Filed Jan. 9, 1962, Ser. No. 165,130
8 Claims. (Cl. 250—222)

The invention relates to mechanisms for detecting or sensing the presence of physical objects within a certain area and especially to such mechanisms utilizing a photoelectric cell mounted at one side of the area to be guarded in alignment with a cell exciting, beam of radiant energy projected across the area from a transmitter mounted at the opposite side of the area.

In installations of such photoelectric cell detectors, it is desirable to allow sufficient light energy from the transmitter to impinge upon a light sensitive area of the photocell while excluding extraneous light therefrom.

The invention involves providing in a photocell detector installation a radiant energy transmitter unit and corresponding receiver unit at opposite sides of an area to be guarded, and means for allowing a predetermined amount of excitation light energy to impinge upon the light sensitive area of the receiver while excluding a maximum amount of extraneous light energy therefrom.

It is, therefore, an object of the invention to provide an improved photocell detector of simple and economical construction in which the transmitter and receiver units may be readily installed and aligned for projecting a light beam from the transmitter unit accurately upon the light sensitive area of its associated receiver for excitation thereof.

Another object is to provide a photocell detector in which interference to its proper operation by extraneous light is minimized.

A further object is to provide a photocell detector in which the light sensitive area of its photocell is sufficiently shielded from extraneous light as to prevent its excitation thereby, while light energy from its transmitter unit is admitted to impinge upon the light sensitive area in sufficient quantity to obtain proper excitation of the photocell.

The invention involves mounting a suitable light source and associated optical system within a tubeholder having a straight line bore to provide a transmitter unit; the optical system and light source being adjustable in the relation to each other within the tube holder. The associated photocell receiver is mounted in a similar tube holder. Means are provided for mounting the tube holders for the receiver and transmitter units on supporting structure in such manner that they may be readily fine aligned with each other to focus the beam of projected energy from the transmitter unit onto the light sensitive area of the photocell of the receiver unit. Shielding means are also adjustably mounted intermediate the light source and the photocell for excluding extraneous light from the light sensitive area of the photocell while allowing a sufficient portion of the projected energy beam to impinge upon the light sensitive area.

Features and advantages of the invention will be seen from the above, from the following description of the preferred embodiment when considered in conjunction with the drawing and from the appended claims.

In the drawing is illustrated a schematic perspective illustration of an entrance way showing two detector mechanisms, embodying the invention, mounted thereat, with portions broken away and some of the elements shown in "exploded view" fashion.

For convenience, two photocell type detectors for sensing the presence of an object in an entrance way, generally designated 11, have been illustrated, mounted one above the other; the lowermost detector being shown in "exploded view" fashion with its components bearing the same numeral designations as those of the uppermost detector. Each detector consists of a radiant energy transmitter unit, generally designated 13, for projecting a beam of radiant energy 15 to a corresponding receiver unit, generally designated 17, which is excited thereby. Receiver and transmitter components which are of similar construction bear the same numeral designations; the letter suffix R being appended to the numeral designations of such receiver components to distinguish them from their counterpart transmitter components, as, for example, tube container 19R for receiver unit 17 and tube container 19 for transmitter unit 13. The same numerals have been used to designate the same elements in the upper and lower detectors.

Each transmitter unit 13 includes a tubular container 19 for holding a light source 21 and suitable optical system 23. Container 19 is in the form of an extruded open ended tube of straight line bore, having an upperly extending attaching flange portion 25. Two vertically disposed stud receiving slots 27 are defined in attaching flange 25 for adjustably attaching by means of fasteners 29 tubular container 19 to the longer leg 31a of an L-shaped mounting bracket 31. Lock washers 33 are provided for securing tubular container 19 (when properly positioned) to mounting bracket 31.

Light source 21 may be a lamp of any suitable type, being shown as having a bayonet type base for removably mounting the lamp in bayonet socket 35. Lamp socket 35 is frictionally secured in a longitudinally slotted tubular socket holder 37. The lamp, lamp socket and holder assembly is mounted into the right end of tubular container 19; a set screw 39 threaded through tubular container 19 and disposed in the longitudinal slot of socket holder 37 serving to frictionally hold the lamp assembly in proper position in tubular container 19.

Optical system 23 for focusing light energy emitted by lamp 21 into a beam 15 for projection to light receiver 17 is mounted in the other end of tubular container 19 and held therein by a set screw 39.

L-shaped mounting bracket 31 is adjustably mounted at two points onto entrance way structure, generally designated 41; at one point by means of stud 43, cooperating with lock washer 45 and hex nut 47; stud 43 passing through entrance way structure 41 and oversized aperture 48 defined in leg 31b of L-shaped mounting bracket 31, and at a second point by means of threaded stud 49, projecting from entrance way structure 41. The threaded end of stud 49 passes through an aperture 51 defined in leg 31a of mounting bracket 31 and has threaded thereon two hex nuts 53, 55, one on each side of leg 31a. L-shaped mounting bracket 31 is formed from one-eighth inch thick spring steel having sufficient flexibility to allow flexing of its leg 31a horizontally by the "backing off" of one of the hex nuts (53, 55) and "taking up" on the other, for purposes to be explained hereinafter. A lock washer 57 is provided for securing mounting bracket leg 31a to threaded stud 49 in final aligned position.

Each receiver unit 17 includes a tubular container 19R similar in construction to tubular container 19 of transmitter unit 13. Tubular container 19R is adjustably attached to an L-shaped mounting bracket 31R, having two legs 31Ra and 31Rb, in a manner similar to that previously described for the mounting of transmitter tubular container 19. Mounting bracket 31R, in turn, is adjustably mounted on entrance way structure 41R, in a manner also similar to that previously described for mounting transmitter mounting bracket 31 onto entrance way structure 41.

A photo-conductive cell 61, having a light sensitive area 63 of rectangular configuration on its face and electrical wire connections 64 to an external electrical circuit (not shown) protruding from its base 61B is provided. Cell 61 is secured inside tubular container 19R at one end thereof by means of a set screw 39R threaded through tubular container 19R and into frictional engagement with the outside surface of the photocell.

A light shield member 65 in the form of a short tube, open at only one end and having a relatively small rectangularly shaped aperture 67 of predetermined dimensions defined in its closed end, facing transmitter unit 13, is similarly secured by a set screw 39R in the other end of tubular container 19R. Aperture 67 is preferably disposed with its longest dimension in a vertical position, for purposes to be explained hereinafter, and serves to admit light energy into tubular container 19R for projection onto light sensitive area 63 of photocell 61.

Interposed between transmitter unit 13 and its corresponding receiver unit 17 is a second light shield 69 in the form of a thin plate of opaque material having a relatively small aperture 71 defined therein; aperture 71 preferably being of rectangular shape and having predetermined dimensions with the longest dimension of the aperture disposed vertically. Aperture 71 is aligned with light beam 15 for admitting the projected light beam therethrough, as will be explained hereinafter. In order to facilitate the proper alignment of aperture 71 with light beam 15, light shield 69 is adjustably mounted onto entrance way structure 41R by means of a stud 73 cooperating with hex nut 75 and lock washer 77; stud 73 passing through an oversized aperture (not shown) defined in the attaching end of light shield 69 and through an aligned aperture formed in entrance way structure 41R for adjustably mounting shield 69 to the entrance way structure, in a manner similar to that previously described for the adjustable mounting of leg 31b of mounting bracket 31 onto entrance way structure 41. Although, for convenience, light shield 69 has been illustrated as having two apertures 71 and 71', one for each detector, individual light shields 69, each having one aperture 71, may be provided and independently adjustably mounted on entrance way structure 41R.

Receiver units 17 and shield 69 are enclosed in a hood 81R, having round apertures 83 defined therein in alignment with rectangular apertures 71 of shield 69 to exclude extraneous light from the receiver units, while allowing light energy to pass only through apertures 71. A similar hood 81 may be provided for enclosing transmitter units 13; the hood having two apertures (not shown) defined in its side surface, facing the receiver units, for allowing light energy to be projected from the transmitter units 13 to their corresponding receiver units 17. If desired, such hood 81 may be omitted.

In photocell type detector installations for sensing the presence of a physical object in an entrance way, such as entrance way 11, a beam of radiant energy is directed across the entrance way from a transmitter unit onto the light sensitive area of a corresponding photocell mounted at the opposite side in alignment with the energy beam. The photocell is excited by the beam, indicating that the beam is presently uninterrupted. Passage of an object through the entrance way interrupts the energy beam, causing the cell to return to unexcited condition, thereby indicating that an object has been sensed or detected in the entrance way.

In certain such installations, extraneous light, such as strong sunlight or light from overhead interior lighting also tends to impinge upon the light sensitive area of the photocell and excite it. In certain such cases, such extraneous light is of sufficient magnitude to "override" the energy beam projected from the detector transmitter unit onto the light sensitive area of the photocell and acts to maintain the photocell in excited condition, notwithstanding that the projected energy beam is interrupted by a physical object in the entrance way. It is therefore desirable to obviate such extraneous light from interfering with proper operation of the detector.

The subject arrangement allows the projected energy beam 15 from transmitter unit 13 to impinge upon light sensitive area 13 of photocell 61, while excluding a sufficient amount of extraneous light rays 85 from such light sensitive area to prevent their falsely exciting the photocell, as will now be described.

After the receiver and transmitter components have been assembled in their respective tube holders 19R, 19, as has been previously described, the tube holders are loosely attached to their respective L-shaped mounting brackets 31R, 31 by means of fasteners 29R, 29 disposed in their respective slots 27R, 27. The L-shaped mounting brackets 31R, 31, are, in turn, loosely mounted on their respective entrance way structures 41R, 41, as has been previously described. The position of each L-shaped mounting bracket 31R, 31 is then adjusted vertically and horizontally on its supporting studs (43R, 49R and 43, 49) by means of oversized apertures (48, 51 and 48R, 51R) to "rough" align transmitter unit 13 with receiver unit 17 to project energy beam 15 upon light sensitive area 63 of the photocell 61. The positioning of optical system 23 relative to lamp 21 in tubular container 19 to properly focus energy beam 15 onto light sensitive area 63 may also be adjusted by "backing off" on their respective set screws 39 and shifting them longitudinally within container 19. Hex nuts 47R, 47 are then tightened to affix the L-shaped mounting brackets 31R, 31 to their respective entrance way structures 41R, 41.

Shield 69 is similarly loosely mounted on supporting structure 41R by means of stud 73, and then moved vertically and horizontally into alignment with beam 15; hex nut 75 then being tightened to secure the shield in its final aligned position.

"Fine" alignment of receiver 13 and transmitter 13 units is obtained by means of their respective fasteners 29R, 29 in their respective slots 27R, 27 of attaching flanges 25R, 25 of the tube containers; tube containers 19R, 19 being moved up or down at either of their ends to properly project beam 15 through light shield apertures 71, 67 and onto light sensitive area 63 of cell 61. Mounting brackets 31R, 31 may also be flexed transversely to obtain such proper alignment of beam 15, as, for example, by flexing transmitter bracket 31 by "backing off" hex nut 55 and "taking up" hex nut 53 or vice versa, as the case may be, thereby moving beam 15 transversely into aligned position through aperture 71 of light shield 69 and aperture 67 of tubular light shield 67 onto light sensitive area 63 of photocell 61.

The receiver 17 and transmitter 17 units are best final aligned with respect to each other to project energy beam 15 onto the area surrounding aperture 71 of light shield 69 at an angle normal to the light shield to allow energy beam 15 to pass through apertures 71 and 67 into receiver tube container 19R and onto light sensitive area 63 of the photocell. Apertures 71 and 67 are formed of such size as to obtain a "camera obscura" effect, i.e. light rays passing through the apertures exit therefrom at the same angle at which they enter the apertures. With such construction, light beam 15, after passing through aperture 71 at an angle normal to shield 69, continues at the same angle through aperture 67 of tubular shield 65 into the straight line bore of tube container 19R to impinge directly upon light sensitive area 63 of photocell 61 in sufficient magnitude to properly excite it.

It may be noted that apertures 71, 67 are preferably of the same configuration as light sensitive area 63 of photocell 61, in the present case, rectangularly shaped, and are dimensioned slightly larger than light sensitive area 63 to assure that light beam 15 covers the entire light sensitive area 63. Extraneous light which passes through relatively small aperture 71 of light shield 69 at other than an angle normal to the shield face, due to the aforementioned "camera obscura" dimensions of aperture 71, exits therefrom at the same angle, thereby missing aperture 67 and, in turn, light sensitive area 63. For example, some of the extraneous light rays 85, striking light shield 69 from the left, continue through aperture 71 at the same angle at which they enter the aperture, thereby missing aperture 67 of light shield 65 and failing to strike light sensitive area 63 of photocell 61. In this manner, aperture 71 acts as a "pinhole" lens opening, preventing extraneous light from impinging upon light sensitive area 63 in sufficient quantity significantly to excite cell 61, while allowing light beam 15, projected at a normal angle to shield 69, to impinge thereon in sufficient strength to properly excite photocell 61, thereby obviating improper operation of the detector due to extraneous light energy.

It may be noted that it is preferable to place the apertures 71, 67 in such position that their respective smallest dimensions are in the direction of the strongest extraneous light, in this case, from the side. This is preferred, since it has been found, in one tested embodiment, that such positioning excludes the maximum amount of extraneous light. It should be apparent that should the extraneous light be of the same strength from all directions an aperture of round configuration would be preferred.

As many changes could be made in the above construction and many apparently widely different embodiments of this invention could be made without departing from the scope thereof, it is intended that all matter contained in the above description or shown on the accompanying drawing shall be interpreted as illustrative and not in a limiting sense.

What is claimed is:
1. Object detecting mechanism for sensing the presence of a physical object in an entranceway defined between two oppositely disposed entranceway framing structures, said detecting mechanism comprising:
  (a) a receiver unit including a photocell adapted for excitation by light energy;
  (b) a transmitter unit for projecting a beam of light energy for exciting said photocell;
  (c) means for adjustably mounting said receiver unit on one of said entranceway framing structures;
  (d) means for adjustably mounting said transmitter unit on the other of said oppositely disposed framing structures in position for projecting its light beam across said entranceway and onto said photocell;
  (e) a light shield of opaque material also adjustably mounted on said one of said framing structures for excluding light energy from said photocell, said light shield having a front face intermediate said photocell and said transmitter, said front face having a certain aperture defined therein, said aperture being dimensioned to obtain a pin hole lens opening effect causing light rays passing therethrough to exit at the same angle at which such rays enter said aperture;
  (f) said receiver unt, said transmitter unit and said light shield being mounted with respect to each other on said framing structures such that adjustment of said means for adjustably mounting said receiver unit and said transmitter unit permits said light beam from said transmitter to pass through said shield aperture at an angle normal to said shield face and onto said photocell for excitation thereof; and
  (g) means disposed intermediate said photocell and said shield aperture for preventing extraneous light rays that pass through said aperture from impinging on said photocell.

2. Object detecting mechanism for sensing the presence of a physical object in an entranceway defined between two oppositely disposed entranceway framing structures, said detecting mechanism comprising:
  (a) a receiver unit consisting of an open ended tubular receiver container of opaque material and straight line bore, and a photocell having a light sensitive area and adapted for excitation by light energy impinging upon said light sensitive area, said photocell being mounted within one end of said receiver tubular container with said light sensitive area facing the other end thereof;
  (b) a transmitter unit for projecting a beam of light energy for exciting said photocell;
  (c) means for adjustably mounting said receiver unit on one of said entranceway framing structures;
  (d) means for adjustably mounting said transmitter unit on the other of said oppositely disposed framing structures in position for projecting its light beam across said entranceway and onto said photocell; and
  (e) a light shield of opaque material also adjustably mounted on said one of said framing structures for excluding light energy from said photocell, said light shield having a front face intermediate said photocell and said transmitter, said front face having a certain aperture defined therein, said aperture being dimensioned to obtain a pin hole lens opening effect causing light rays passing therethrough to exit at the same angle at which such rays enter said aperture;
  (f) the positions of said transmitter, shield and photocell on said framing structures being adjusted with respect to each other to cause said light beam from said transmitter to pass through said shield aperture at an angle normal to said shield face and onto said photocell for excitation thereof while preventing extraneous light rays pasisng through said aperture at other than said normal angle from exciting said photocell.

3. Object detecting mechanism as set forth in claim 1 wherein said transmitter unit consists of an open ended tubular transmitter container of opaque material and straight line bore, a light source assembly adapted for generating light energy, an optical system for focusing, said generated light energy into a light beam, mounting means for adjustably mounting said light source assembly within a first end of said transmitter container in position for generating said light energy within said transmitter container, and optical system mounting means for adjustably mounting said optical system within the other end of said transmitter container, said light source assembly and optical system being positioned with respect to each other for projecting a focused beam of light from said transmitter container onto a predetermined area external thereto.

4. Object detecting mechanism for sensing the presence of a physical object in an entranceway defined between two oppositely disposed entranceway framing structures, said detecting mechanism comprising:
  (a) a receiver unit including a photocell adapted for excitation by light energy;
  (b) a transmitter unit for projecting a beam of light energy for exciting said photocell;
  (c) means for adjustably mounting said receiver unit on one of said entranceway framing structures, said means including an L-shaped mounting bracket having an attaching leg and a receiver unit supporting leg, first attaching means adjustably attaching said attaching leg to said one of said entranceway structures for vertical and horizontal manual positioning of said entire bracket, second attaching means adjustably attaching said receiver unit supporting leg to said one of said entranceway structures for manual horizontal flexing of said supporting leg, and third attaching means for adjustably mounting said receiver unit onto said supporting leg for vertical manual positioning of said receiver unit thereon;
  (d) means for adjustably mounting said transmitter unit on the other of said oppositely disposed framing structures in position for projecting its light beam across said entranceway and onto said photocell; and (e) a light shield of opaque material also adjustably mounted on said one of said framing structures for excluding light energy from said photocell, said light shield having a front face intermediate said photocell and said transmitter, said front face having a certain aperture defined therein, said aperture being dimensioned to obtain a pin hole lens opening effect causing light rays passing therethrough to exit at the same angle at which such rays enter said aperture;

(f) the positions of said transmitter, shield and photocell on said framing structures being adjusted with respect to each other to cause said light beam from said transmitter to pass through said shield aperture at an angle normal to said shield face and onto said photocell for excitation thereof while preventing extraneous light rays passing through said aperture at other than said normal angle from exciting said photocell.

5. Object detecting mechanism for sensing the presence of a physical object in an entranceway defined between two oppositely disposed entranceway framing structures, said detecting mechanism comprising:

(a) a receiver unit including a photocell adapted for excitation by light energy;

(b) a transmitter unit for projecting a beam of light energy for exciting said photocell;

(c) means for adjustably mounting said receiver unit on one of said entranceway framing structures;

(d) means for adjustably mounting said transmitter unit on the other of said oppositely disposed framing structures in position for projecting its light beam across said entranceway, said means for adjustably mounting including an L-shaped mounting bracket having an attaching leg and a transmitter unit supporting leg, first attaching means, means adjustably attaching said attaching leg to said other of said entranceway framing structures for vertical and horizontal manual positioning of said entire bracket, second attaching means adjustably attaching said transmitter unit supporting leg to said other of said entranceway structures for manual horizontal flexing of said supporting leg, and third attaching means for adjustably mounting said transmitter unit onto said supporting leg for vertical manual positioning of said transmitter unit thereon; and (e) a light shield of opaque material also adjustably mounted on said one of said framing structures for excluding light energy from said photocell, said light shield having a front face intermediate said photocell and said transmitter, said front face having a certain aperture defined therein, said aperture being dimensioned to obtain a pin hole lens opening effect causing light rays passing therethrough to exit at the same angle at which such rays enter said aperture;

(f) the positions of said transmitter, shield and photocell on said framing structures being adjusted with respect to each other to cause said light beam from said transmitter to pass through said shield aperture at an angle normal to said shield face and onto said photocell for excitation thereof while preventing extraneous light rays passing through said aperture at other than said normal angle from exciting said photocell.

6. Object detecting mechanism for sensing the presence of a physical object in an entranceway defined between two oppositely disposed entranceway framing structures, said detecting mechanism comprising:

(a) a receiver unit including a tubular receiver container of opaque material and straight line bore, said tubular container being open at one end and having an aperture defined in the other end, and a photocell having a light sensitive area of predetermined configuration and adapted for excitation by light energy impinging upon said light sensitive area, said photocell being mounted within said open end of said container with its light sensitive area facing and in axial alignment with said aperture, said aperture being configurated like said light sensitive area and being dimensioned to obtain a pin hole lens opening effect causing light rays passing therethrough to exit at the same angle at which such rays enter said aperture;

(b) a transmitter unit for projecting a beam of light energy for exciting said photocell;

(c) means for adjustably mounting said receiver unit on one of said entranceway framing structures;

(d) means for adjustably mounting said transmitter unit on the other of said oppositely disposed framing structures in position for projecting its light beam across said entranceway and onto said photocell; and (e) a light shield of opaque material also adjustably mounted on said one of said framing structures for excluding light energy from said photocell, said light shield having a front face intermediate said photocell and said transmitter, said front face having a certain aperture defined therein, said aperture being dimensioned to obtain a pin hole lens opening effect causing light rays passing therethrough to exit at the same angle at which such rays enter said aperture;

(f) the positions of said transmitter, shield and photocell on said framing structures being adjusted with respect to each other to cause said light beam from said transmitter to pass through said shield aperture at an angle normal to said shield face and onto said photocell for excitation thereof while preventing extraneous light rays passing through said aperture at other than said normal angle from exciting said photocell.

7. Object detecting mechanism for sensing the presence of a physical object in an entranceway defined between two vertically disposed entranceway framing structures; said detecting mechanism comprising; a receiver unit including a photocell having a light sensitive area and adapted for excitation by light energy of a certain magnitude impinging upon said light sensitive area, and an open ended tubular receiver container of straight line bore and opaque material, said photocell being mounted within one end of said receiver tubular container with its light sensitive area facing the other end of said receiver container; a transmitter unit including a light source assembly adapted for generating light energy, an optical system for focusing said generated light energy into a light beam and an open ended tubular transmitter container of straight line bore and opaque material, said light source assembly and optical system being adjustably mounted within opposite ends of said transmitter container for projecting from said transmitter container a focused beam of light energy along the longitudinal axis of said transmitter container; transmitter mounting means for adjustably mounting said transmitter unit on a first one of said entranceway structures in position for projecting said focused beam of light across said entranceway, receiver mounting means for adjustably mounting said receiver unit onto the other of said entranceway structures; said transmitter and receiver units being positioned with respect to each other by their respective said mounting means to cause their respective longitudinal axes to coincide and said focused beam of light projected across said entranceway by said transmitter unit to enter said other end of said receiver container and impinge upon said light sensitive area of said photocell mounted therein; the positions of said light source assembly and its said optical system being adjusted one with respect to the other within said transmitter container to focus said light beam directly upon said light sensitive area.

8. Object detecting mechanism as set forth in claim 7 wherein said receiver unit includes a light shield of opaque material closing the other end of said receiver tubular container, said shield having defined therein an aperture in alignment with said light sensitive area of said photocell for admitting light thereto, said aperture being dimensioned to obtain a pin hole lens opening effect causing light rays passing therethrough to exit at the same angle at which such rays enter said aperture.

References Cited by the Examiner
UNITED STATES PATENTS

| | | | |
|---|---|---|---|
| 1,970,579 | 8/34 | Schweitzer | 250—221 |
| 2,457,113 | 12/48 | Alden | 250—239 X |
| 2,773,412 | 12/56 | Huck | 250—219 X |
| 2,918,585 | 12/59 | Farmer | 250—239 |
| 3,041,461 | 6/62 | Lindemann et al. | 250—239 X |

RALPH G. NILSON, *Primary Examiner.*
WALTER STOLWEIN, *Examiner.*